May 20, 1930.  G. A. CARLSON  1,759,539
CORING AND PEELING DEVICE
Filed July 21, 1928
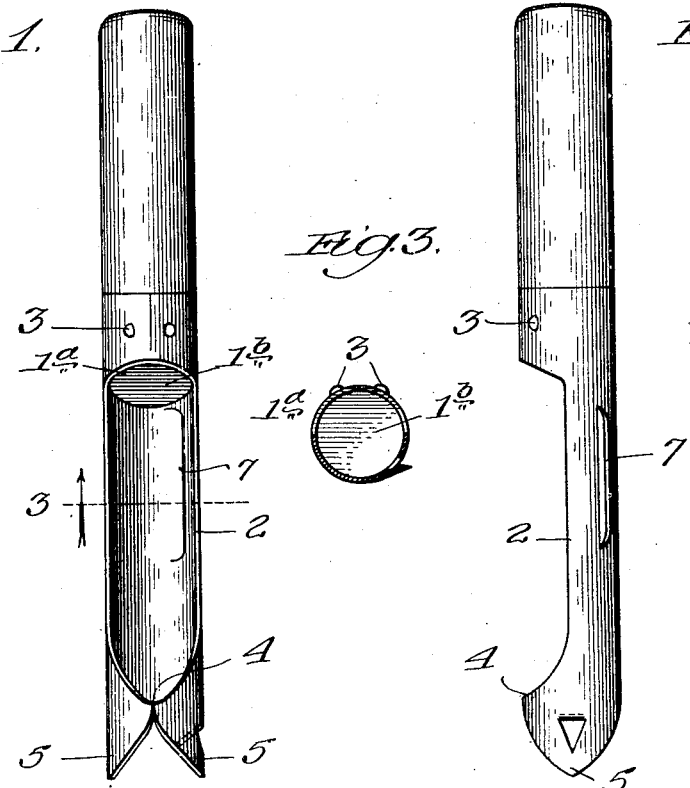
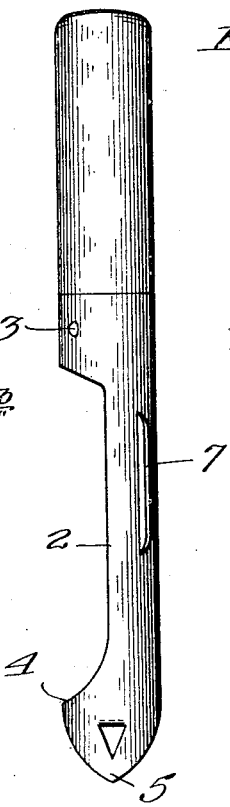
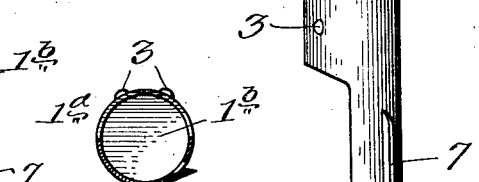
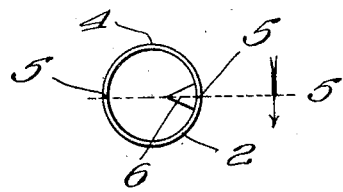
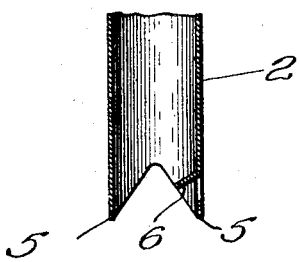
Inventor:
Gustav A. Carlson Patented May 20, 1930

1,759,539

UNITED STATES PATENT OFFICE

GUSTAV A. CARLSON, OF CHICAGO, ILLINOIS, ASSIGNOR TO THE BOYE NEEDLE COMPANY, OF CHICAGO, ILLINOIS, A CORPORATION OF ILLINOIS

CORING AND PEELING DEVICE

Application filed July 21, 1928. Serial No. 294,500.

This invention relates particularly to a coring and peeling device which is especially adapted for removing the cores from apples and for peeling potatoes and removing eyes from potatoes.

A primary object is to provide a device of simple and cheap construction which will enable the core of the apple to be removed with ease and without passing the coring device entirely through the fruit. By leaving the bottom of the apple untouched, a cup is provided in the apple which may be found desirable for containing sugar and juices during the baking operation.

The invention is illustrated in its preferred embodiment in the accompanying drawing, in which—

Figure 1 represents a top plan view of the device; Fig. 2, a side view in elevation; Fig. 3, a transverse sectional view, the section being taken as indicated at line 3 of Fig. 1; Fig. 4, an end view of the cutting end of the device; and Fig. 5, a sectional view, the section being taken as indicated at line 5 of Fig. 4.

The device comprises a handle 1 and, secured thereto, a tubular member 2.

The handle 1 may be constructed of any suitable material, such as, for example, wood, and is preferably equipped at its end with a shank $1^a$ which is adapted to receive the upper end of the tubular member 2. The shank $1^a$ is preferably beveled at its lower end, as indicated at $1^b$. Any suitable means may be employed for securing the tubular member 2 to the shank $1^a$. In the illustration given, nails or tacks 3 are employed.

In the illustration given, the tubular member 2 is preferably formed of sheet metal which is rolled into tubular form. It has its front wall cut away from a point near the lower end of the handle to a point near the lower end of the tubular member, as indicated at 4. At a point below 4, a V-shaped portion of the tubular member 2 is preferably struck out, leaving the furcated points 5. A cutting segment 6 is preferably struck inwardly from one of the pointed furcations 5. Also, a longitudinal cutting segment 7 is struck outwardly from one side of the tubular member 2.

In the operation of the device, the tubular member 2 is passed through the apple until the points 5 touch the table upon which the apple is supported. The device is then withdrawn a slight distance, say one-fourth of an inch, and rotated to enable the cutting segment 5 to sever the core. The core may then be removed or, if the device is used successively, the cores will pass through the channel of the tubular member and will be forced out by the beveled surface $1^b$.

It will be seen that the points 5, in this operation, will merely prick the skin at the lower end of the apple; and the implement then, on being withdrawn slightly and rotated, will sever and remove the core without having passed entirely through the apple.

It will be noted that in the operation of inserting the coring-device into the apple, the lower edges of the piercing points 5 make part-cylindrical incisions in the apple. One of the members 5 cuts a path in advance of the base-portion of the core-severing member 6, thus facilitating the insertion of the implement. Also, the member, or brad 6, is symmetrically positioned, as distinguished from a spiral formation, so that rotation may be effected without a cork-screw action.

If desired, only one point 5 may be employed. In the illustration given, a cutting segment is struck from only one of the pointed furcations 5. However, if desired, a segment may be struck from each of the points, thus enabling the cutting operation to be completed by a half rotation of the device.

The outwardly struck cutting segment 7 may be used for peeling potatoes and other vegetables and fruits. The pointed furcations 5 will serve also for gouging out eyes from potatoes.

What I regard as new, and desire to secure by Letters Patent, is:

1. An apple-coring device, comprising a handle, and a tubular coring member having a cut-away side and a pointed piercing member, said piercing member having a symmetrically disposed core-severing member struck inwardly therefrom substantially in longitudinal alignment with the point of said piercing member and said piercing member having a cutting edge adapted to make an incision in advance of the base of the core-severing member during insertion of the implement.

2. An apple-coring device, comprising a handle and a tubular coring member carried thereby having its free end formed of two opposed pointed furcations adapted to make part-cylindrical incisions in the apple during insertion of the implement, one of said furcations having above its point an inwardly struck symmetrically disposed core-severing member adapted upon rotation of the device to make a circular incision in the lower portion of the core, the point-portion of said last-mentioned furcation effecting a curved incision in advance of the base-portion of the core-severing member during insertion of the implement.

In testimony whereof, I have hereunto set my hand this 10th day of July, 1928.

GUSTAV A. CARLSON.